(12) United States Patent
Xiao et al.

(10) Patent No.: US 8,748,743 B2
(45) Date of Patent: Jun. 10, 2014

(54) JUNCTION BOX IMPROVED LOCKING PORTION

(75) Inventors: Xue-Yuan Xiao, Kunshan (CN); Hong-Qiang Han, Kunshan (CN); Zi-Qiang Zhu, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 11 days.

(21) Appl. No.: 13/542,648

(22) Filed: Jul. 5, 2012

(65) Prior Publication Data

US 2013/0012060 A1 Jan. 10, 2013

(30) Foreign Application Priority Data

Jul. 5, 2011 (CN) .................. 2011 2 0232939 U
Jul. 5, 2011 (CN) .................. 2011 2 0234499 U (51) Int. Cl.
*H02G 3/08* (2006.01)
*H01R 13/46* (2006.01)

(52) U.S. Cl.
USPC .......... 174/50; 174/520; 174/138 F; 174/559; 439/535; 439/536

(58) Field of Classification Search
USPC ........... 174/480, 481, 50, 53, 57, 58, 559, 59, 174/138 F, 17 R, 17 CT, 520; 439/709, 842, 439/843, 76.1, 76.2, 949, 535, 536; 361/600, 601, 679.01, 724, 823, 824, 361/825
See application file for complete search history.

(56) References Cited

U.S. PATENT DOCUMENTS

| | | | |
|---|---|---|---|
| 7,097,516 B2 * | 8/2006 | Werner et al. .................. | 439/709 |
| 7,591,690 B1 * | 9/2009 | Chien et al. .................... | 439/709 |
| 7,763,807 B2 * | 7/2010 | Richter ....................... | 174/138 F |
| 7,824,189 B1 * | 11/2010 | Lauermann et al. ......... | 439/76.1 |
| 7,939,754 B2 * | 5/2011 | Richter et al. ................... | 174/50 |
| 7,960,650 B2 * | 6/2011 | Richter et al. ................... | 174/50 |
| 8,003,885 B2 * | 8/2011 | Richter et al. ................... | 174/50 |
| 8,040,678 B2 * | 10/2011 | Tai et al. ........................ | 174/480 |
| 8,097,818 B2 * | 1/2012 | Gerull et al. ..................... | 174/59 |
| 8,197,263 B2 * | 6/2012 | Rueggen et al. .............. | 439/76.1 |
| 8,403,711 B2 * | 3/2013 | Xue et al. ....................... | 439/709 |
| 8,512,050 B2 * | 8/2013 | McGreevy et al. ........... | 439/76.1 |

FOREIGN PATENT DOCUMENTS

EP 2279529 2/2011

* cited by examiner

*Primary Examiner* — Angel R Estrada
(74) *Attorney, Agent, or Firm* — Wei Te Chung; Ming Chieh Chang (57) ABSTRACT

A junction box includes a cable connecting box including an insulative box and a wire connecting module assembled to the insulative box. The insulative box has a receiving cavity, a bottom wall under the receiving cavity, a plurality of walls surrounding around the receiving cavity, at least a supporting portion located in the walls, a locking slot defined between the supporting portion and one of the walls, and a resilient locking portion received in the locking slot. A cover covers the cable connecting box and comprises a latching portion protruding outwardly from a side of the cover to lock with the resilient locking portion in the locking slot. In this arrangement, the junction box is convenient for users service.

18 Claims, 11 Drawing Sheets

JUNCTION BOX IMPROVED LOCKING PORTION

BACKGROUND OF THE INVENTION

1. Field of the Invention

The present invention generally relates to a junction box, and more particularly to a junction box with improved locking portion.

2. Description of Related Art

EP patent publication NO. 2279529 published on Feb. 2, 2011 discloses a PV junction box including an insulative box, a cover covering the insulative box, a plurality of connecting foils and a plurality of diodes connecting with two neighborly connecting foils. The insulative box includes a bottom wall, a front wall, a rear wall and two side walls extending upwardly from the bottom wall and a cavity defined by these walls. The front wall and two side walls all comprise locking portions, and the cover has a plurality of preventing portions engaging with the locking portions to combine the cover and the insulative box together. However, once the junction box work unusually and need to be check inside, for the cover and the insulative box are combined together by a rigid interference between the locking portions and the preventing portions, and the cover is difficult to be opened from the insulative box, that may bother users.

Hence, an improved junction box is desired to overcome the above problems.

SUMMARY OF THE INVENTION

An objector of the invention is to provide a junction box with improved locking portion.

According to one aspect of the present invention, a junction box comprises a cable connecting box including an insulative box and a wire connecting module assembled in the insulative box, the insulative box having a receiving cavity, a bottom wall under the receiving cavity, a plurality of walls surrounding the receiving cavity, the plurality of walls having a front wall, a rear wall and two side walls. At least a supporting portion located outside the front wall, a locking slot defined between the supporting portion and the front wall, and a resilient locking portion sisclosed in the locking slot; a cover covering the cable connecting box and comprising a latching portion protruding outwardly from a side thereof to lock with the resilient locking portion in the locking slot.

Other objects, advantages and novel features of the present invention will become more apparent from the following detailed description of the present embodiment when taken in conjunction with the accompanying drawings.

DETAILED DESCRIPTION OF THE INVENTION

Reference will now be made to the drawing figures to describe the preferred embodiment of the present invention in detail.

Referring to FIGS. 1-11, a junction box 100 used for electrically connecting a photovoltaic (PV) module (not labeled) and transmitting electrical current according to the present invention is disclosed. The junction box 100 includes a cable connecting box, a cover 2 covering an upper side of the cable connecting box and a cable 4 connecting with the cable connecting box. The cable connecting box includes a plastic insulative box 1 and a wire connecting module 3 attached to the insulative box 1.

Figure 1:
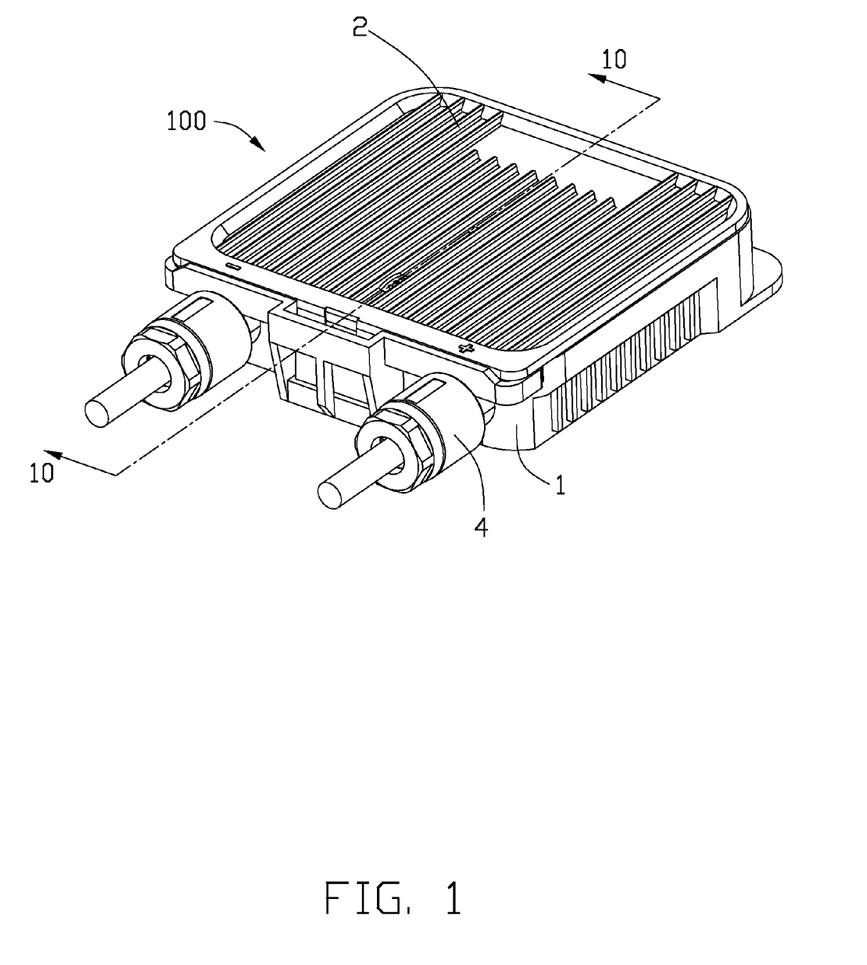
FIG. 1 is an assembled perspective view of a junction box according to a preferred embodiment of the present invention.
Figure 2:
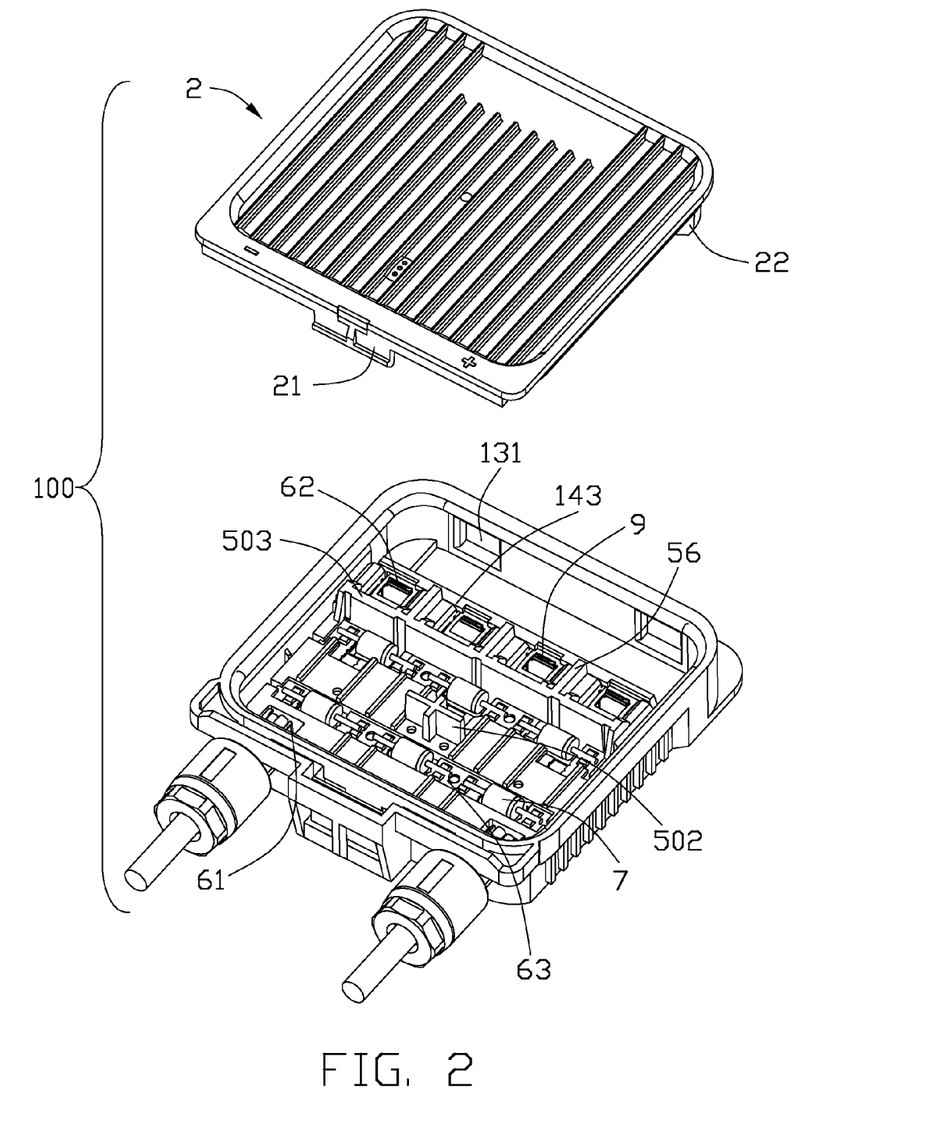
FIG. 2 is another assembled perspective view of the junction box according to the present invention, but taken from another view, which discloses the cover separated from a cable connecting box.
Figure 3:
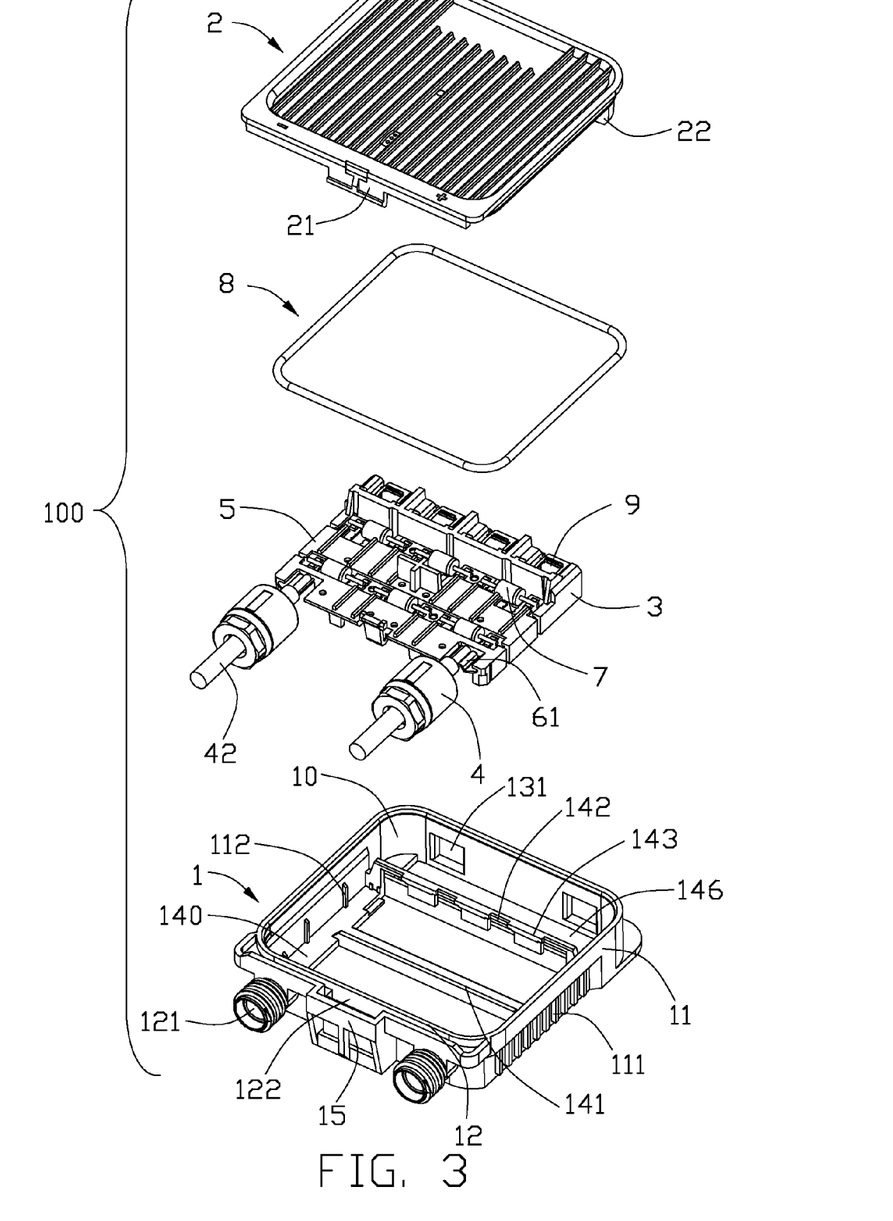
FIG. 3 a partly exploded perspective view of the junction box with a cover separated from the cable connecting box.
Figure 4:
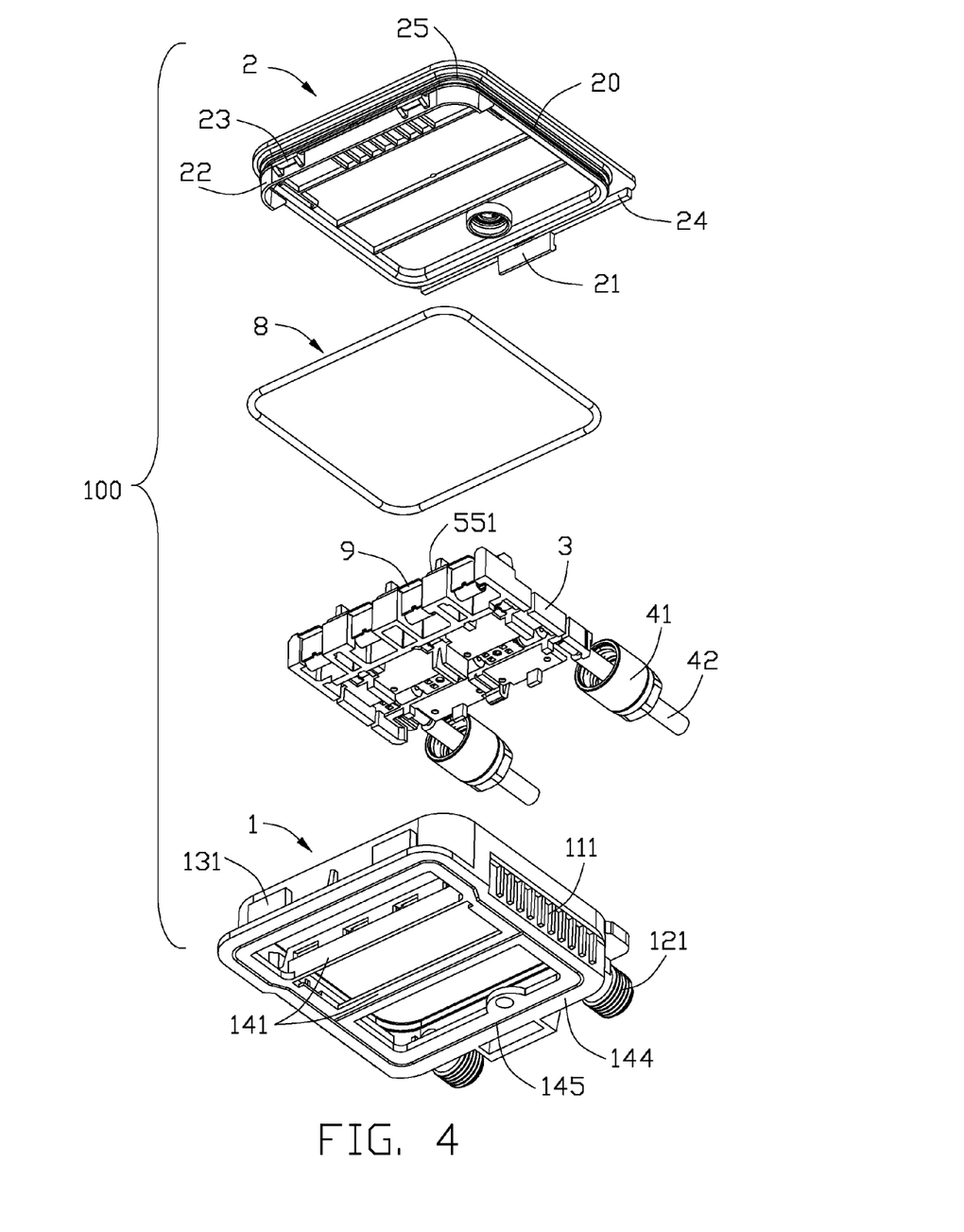
FIG. 4 is similar with FIG. 3, but taken from another view.
Figure 5:
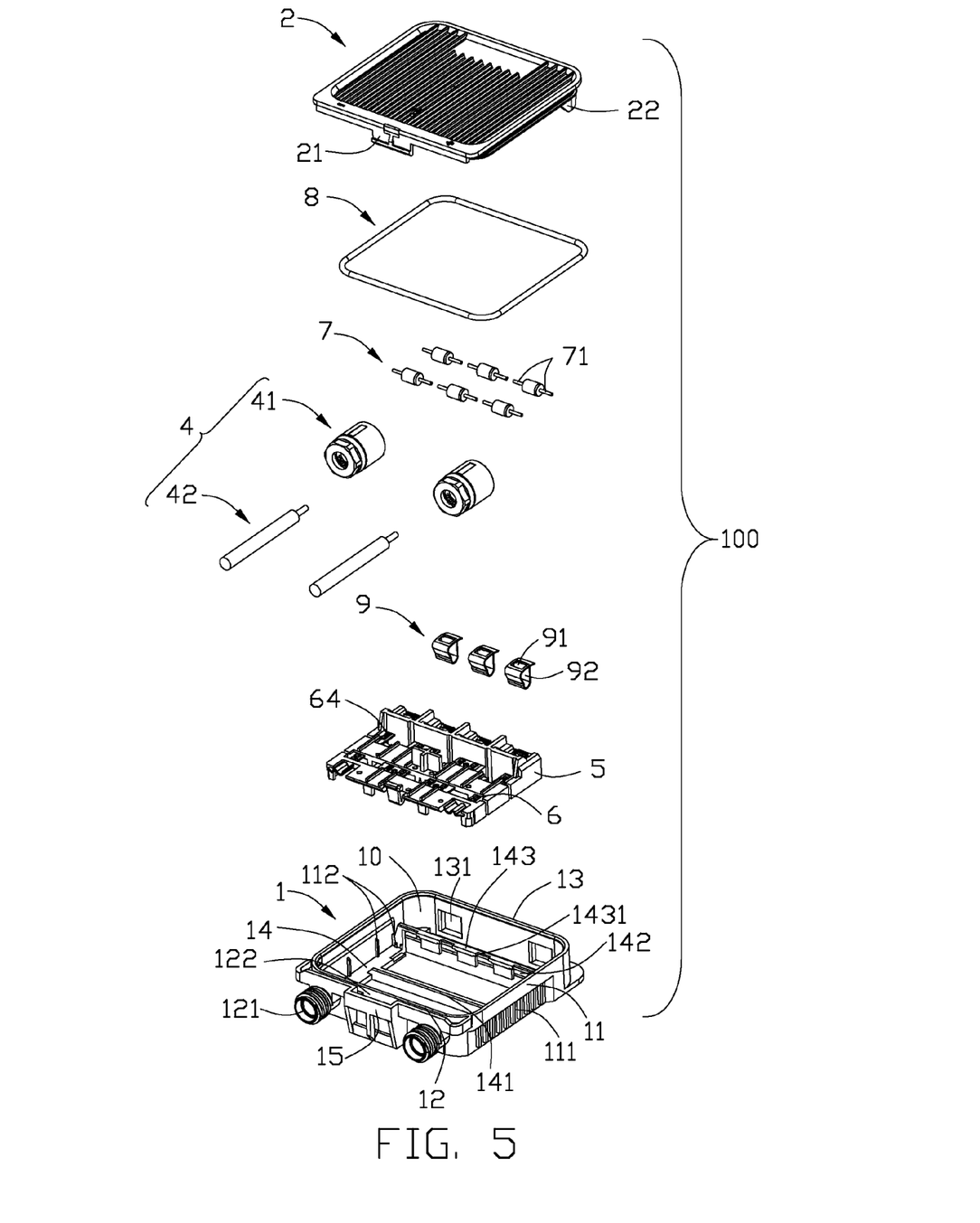
FIG. 5 is an exploded perspective view of the junction box.
Figure 6:
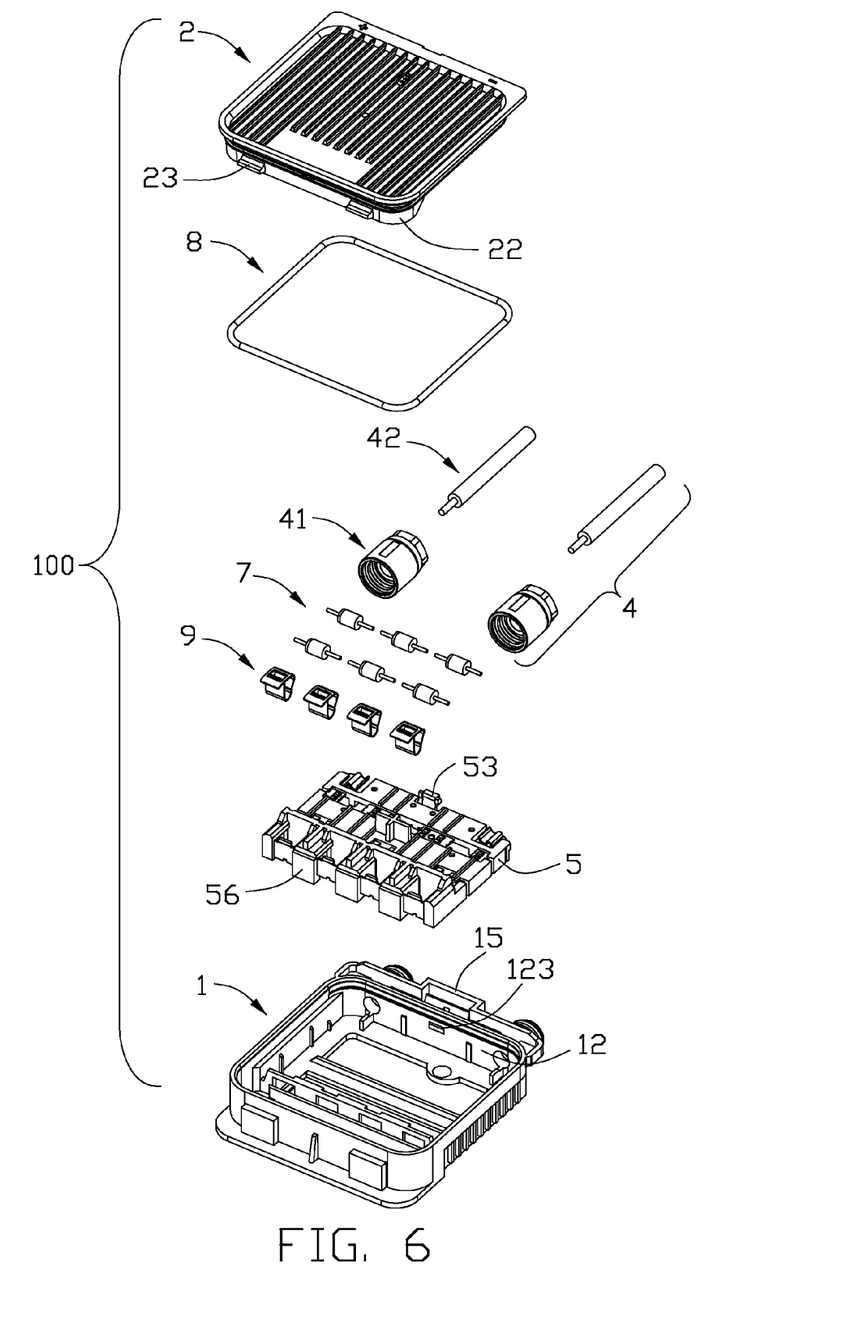
FIG. 6 is similar with FIG. 5, while taken from a different aspect.
Figure 7:
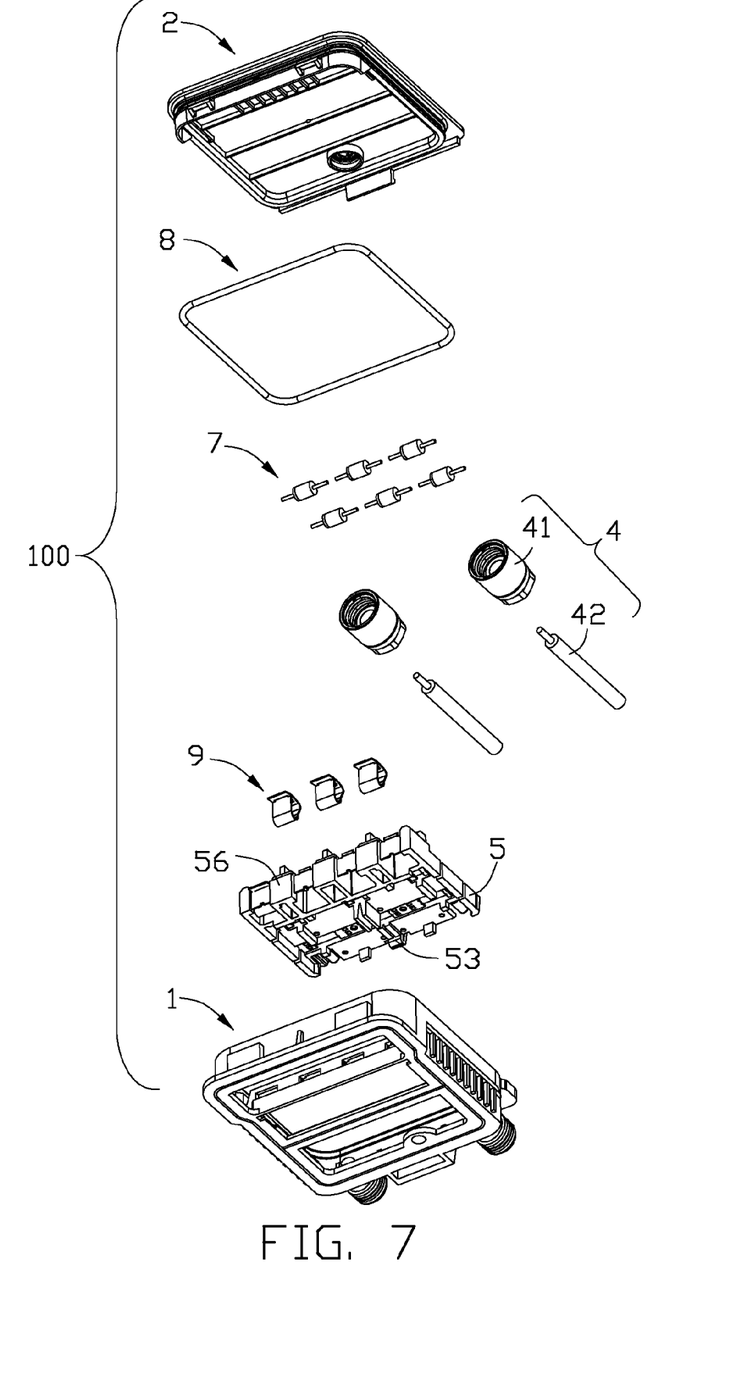
FIG. 7 is similar with FIG. 6, while taken from another different aspect.
Figure 8:
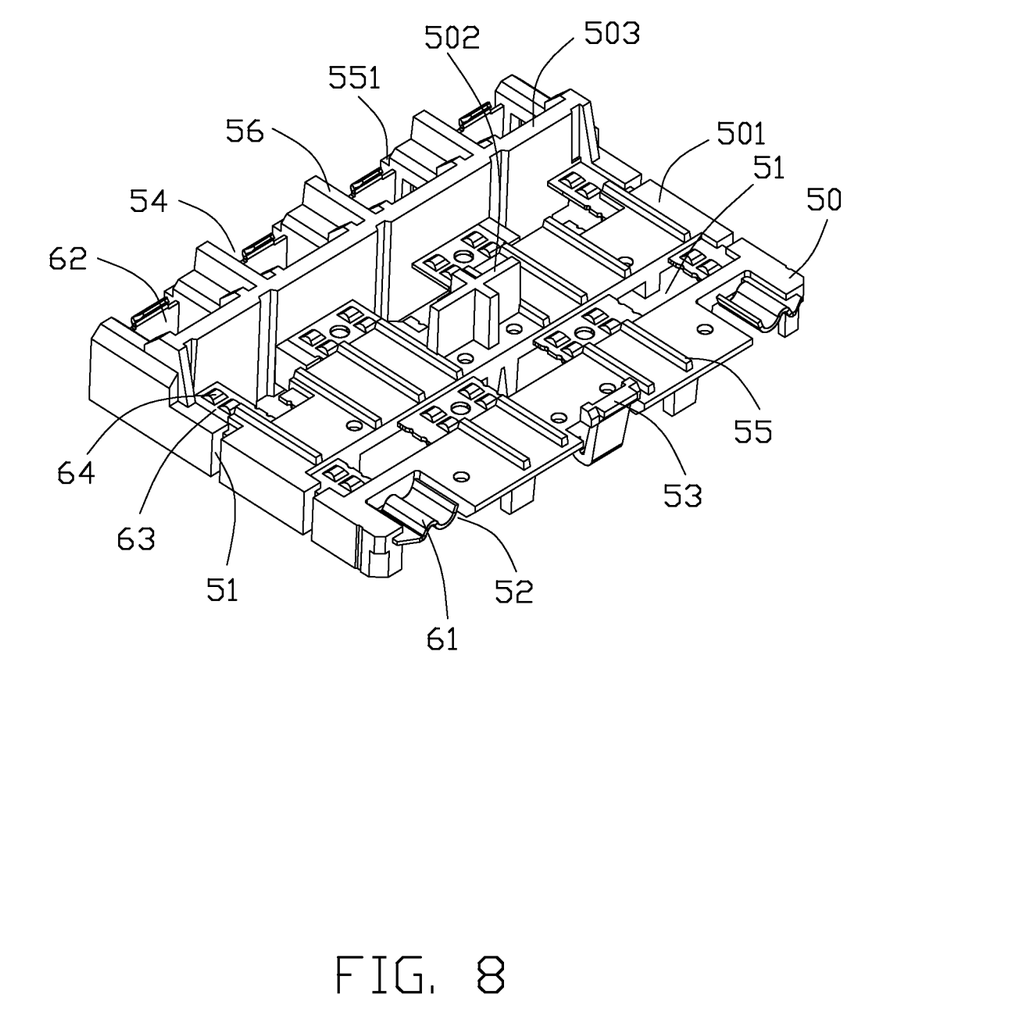
FIG. 8 is a perspective view of a wire connecting module of the junction box.

Please referring to FIGS. 3-4, the wire connecting module 3 includes a insulative block 5 presented as a rectangular shape, a plurality of metal contacting foils 6 and a plurality of diodes 7 connecting with two neighborly contacting foils 6.

Please referring to FIGS. 4-8, the insulative block 5 has a body portion 50 approximately shaped as a rectangular plate, a plurality of hollows 51 extending through the body portion 50 along an up-to-down direction. The body portion 50 has a top face 501 facing the cover 2 and a plurality of ribs 55 protruding upwardly from the top face 501.

In present invention, the insulative block 5 has two such hollows 51 arranged along a front-to-back direction. The insulative block 5 is divided into three portions along the front-to-back direction by the hollows 51, which extend along a transverse direction vertical to the front-to-back direction of the body portion 50. The first portion of the body portion 50 is formed with a pair of first escaping portions 52 at two sides of a front end thereof and a hook 53 at a middle of the front end thereof. The first escaping portions 52 extend through the body portion 50 along the up-to-down direction. The hook 53 extends forwardly and downwardly, then bents upwardly from the middle of the body portion 50. By this arrangement, the hook 53 may has a better resilient property to be removed easily.

The second portion of the body portion 50 includes a supporting portion 502 extending upwardly from the top surface 501 to support the cover 2. The third portion of the body portion 50 has a fence 503 extending along the transverse direction and located at a rear of the second portion, and a plurality of second escaping portions 54 recessed forwardly from a rear edge thereof. Each two adjacent second escaping portions 54 has a separating wall 56 therebetween. The separating wall 56 defines a plurality of depressions 551 at a top of a rear end of the separating plate 56. The ribs 55 extend along the front-to-back direction and are distributed uniformitily on the top face 501 to enlarge an area for heat dissipation. The ribs 55 are parallel to each other. The ribs 55 provide a lager area for the junction box 100 heat dissipate timely.

The contacting foils 6 have a plurality of connecting portions 61 connecting with the cable 4 and received in the first escaping portions 52, a plurality of base portions mostly insert-molded in the body portions 50 and extending backwardly along a mating direction of the cable 4, and a plurality of contacting portions 62 extending backwardly from the base portion and connecting with the photovoltaic module. The base portions further have a plurality of soldering portions 63 exposed in the hollows 51. The soldering portions 63 have a plurality of embosses 64 protruding upwardly, each soldering portion 63 has a pair of embosses 64.

The junction box 100 further has a plurality of clamp springs 9 for clamping the contacting portions 62 of the contacting foils 6 and a plurality of contacting plates (not labeled) of the photovoltaic module. One end of the clamp spring 9 defines a through hole 91, the other end of the clamp spring 9 has a tab 92 with a width of the tab 92 smaller than that of a body of the clamp spring 9. The tab 92 extends through the through hole 91, and the contacting portion 62 is clamped between the tab 92 and an inner wall of the through hole 91. Insert the contacting plate of the photovoltaic module into an area between the tab 92 and the inner wall of the through hole 91 and be clamped by the tab 92 and the inner wall of the through holes 91 to electrically connect the junction box 100 with the photovoltaic module.

Each of the diodes 7 has a pair of tails 71 extending outwardly from two sides thereof, each tail 71 is soldered between two adjacent embosses 64 of the soldering portions 63.

Please referring to FIGS. 1-7, and FIG. 10, the insulative box 1 presents as a rectangular box, including two side walls 11, a front wall 12 and a rear wall 13 connecting the two side walls 11, a receiving cavity 10 surrounding by the side walls 11, the front wall 12 and the rear wall 13. The insulative box 1 further comprises a bottom wall 14 located under the receiving cavity 10 and a supporting portion 15 connecting with two side walls 11 and located in front of the front wall 12. The supporting portion 15 presents as a T shape. The front wall 12 defines two side by side mounting holes 121 with exterior thread, from which the cable extending through to connect with the connecting portions 61. The mounting holes 121 are located under the supporting portion 15. A locking slot 122 is defined between the supporting portion 15 and the front wall 12 and opening upwardly, and a resilient locking portion 151 is formed in the locking slot 122. Please reference to FIGS. 10-11, the resilient locking portion 151 is extending upwardly from a bottom of the looking slot 122. A depressing slot 123 is recessed from a surface facing to the receiving cavity 10 for locking with the hook 53 of the insulative block 5. Please reference to FIG. 6, the hook 53 and the depressing slot 123 engage with each other, when the insulative block 5 is damaged, the user can remove the insulative block 5 away from the junction box 100 by levering the hook 53. So, the junction box 100 can be partly replaced to save cost. The two side walls 11 have a plurality of ribs 111 extending along the up-to-down direction on outsides of the side walls 11 to enlarge an area for heat dissipation. A plurality of position blocks 112 extend inwardly along the up-to-down direction on insides of the side walls 11 to engage with the insulative block 5.

The rear wall 13 defines two locking holes 131 extending through thereof along a front-to-back direction. The bottom wall 14 has a plurality of windows (not labeled) and two bridges 141 extending along a transverse direction between the windows and being parallel to each other. One of the bridge 141 closed to the rear wall 13 defines a plurality of openings 142 extending therethrough along a front-to-back direction and arranged side by side, the bridge 141 further has an pressing portion 143 located between two neighborly openings 142 to engage with the depression 551. A passageway 146 is formed between the bridge 141 near to the rear wall 13 and the rear wall 13 for the contacting plates of the photovoltaic module inserting into. Two sides of the pressing portion 143 extend outwardly till the opening 142 to from a pair of engaging portions 1431 to abut against a free end of the clamp spring 9 with the through hole 91 to prevent the clamp spring 9 from loosing. The bottom wall 14 defines an inner face 140, a mounting face 144 opposite to the inner face 140 and a slit 145 depressing from the mounting face 144 for the users coat adhesive, the slit 145 is shown in a circle surrounding in the mounting face 144. The slit 145 can absorb much more glue which is used to stick the junction box 100 to the PV module to get a well combination.

Figure 9:
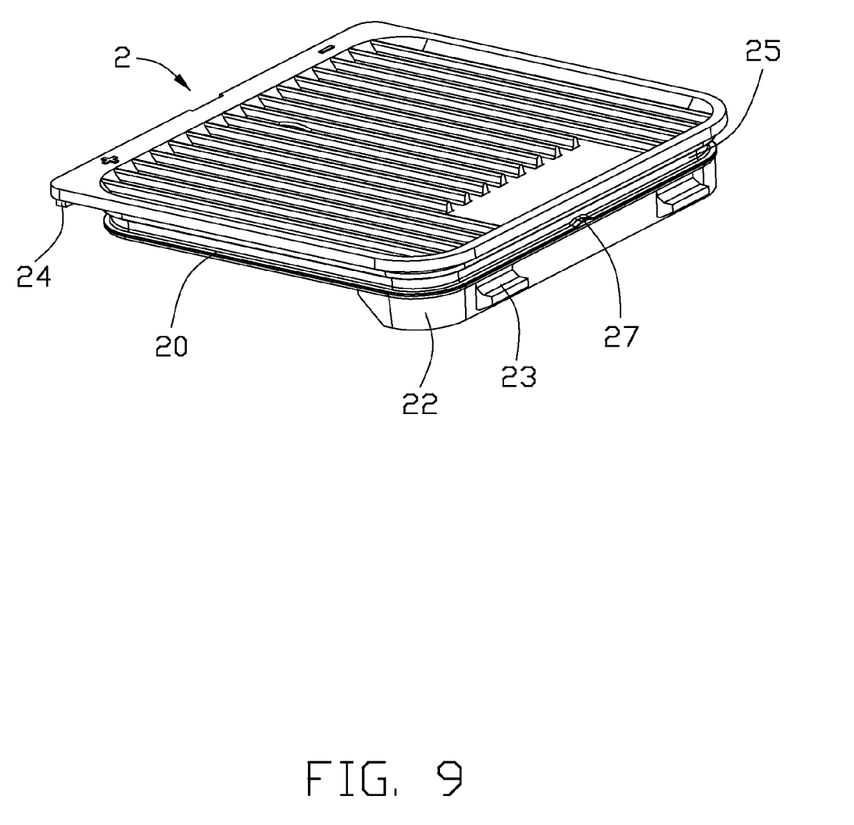
FIG. 9 is a perspective view of a cover of the junction box.
Figure 10:
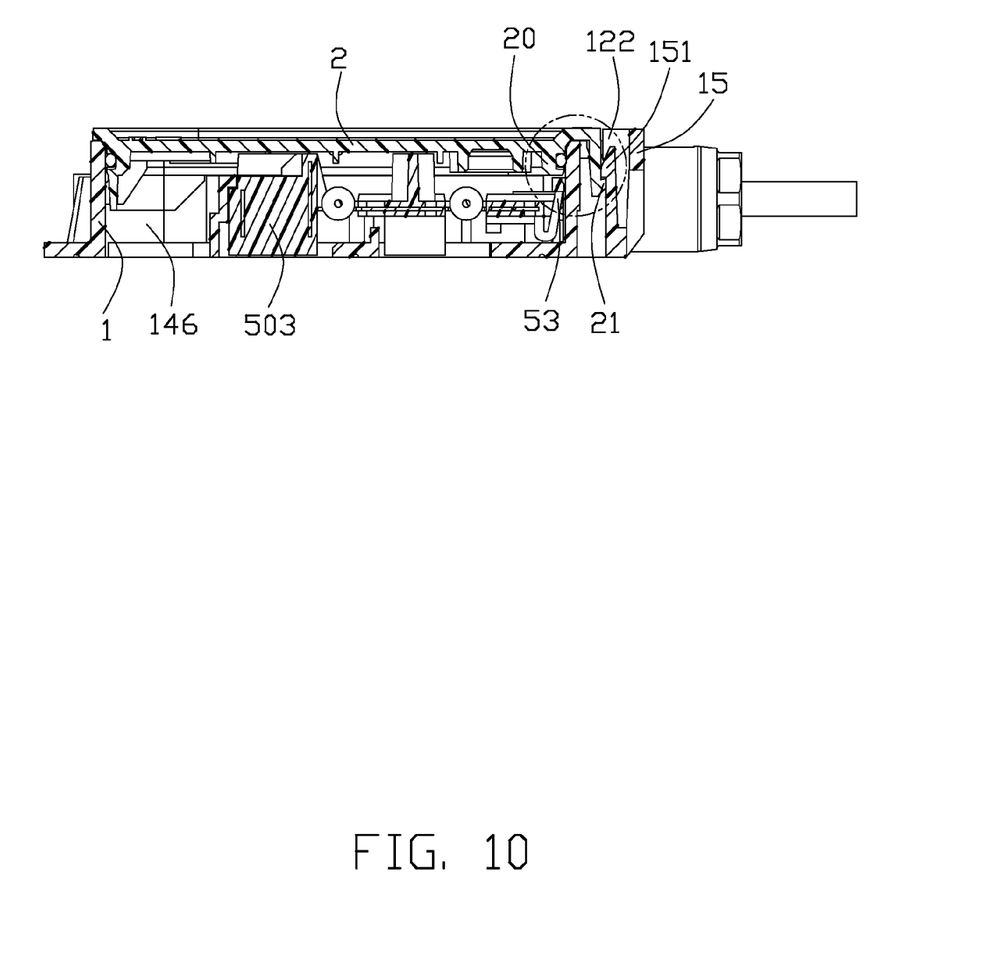
FIG. 10 is a cross-sectional view of the junction box taken along line 10-10 of FIG. 1.
Figure 11:
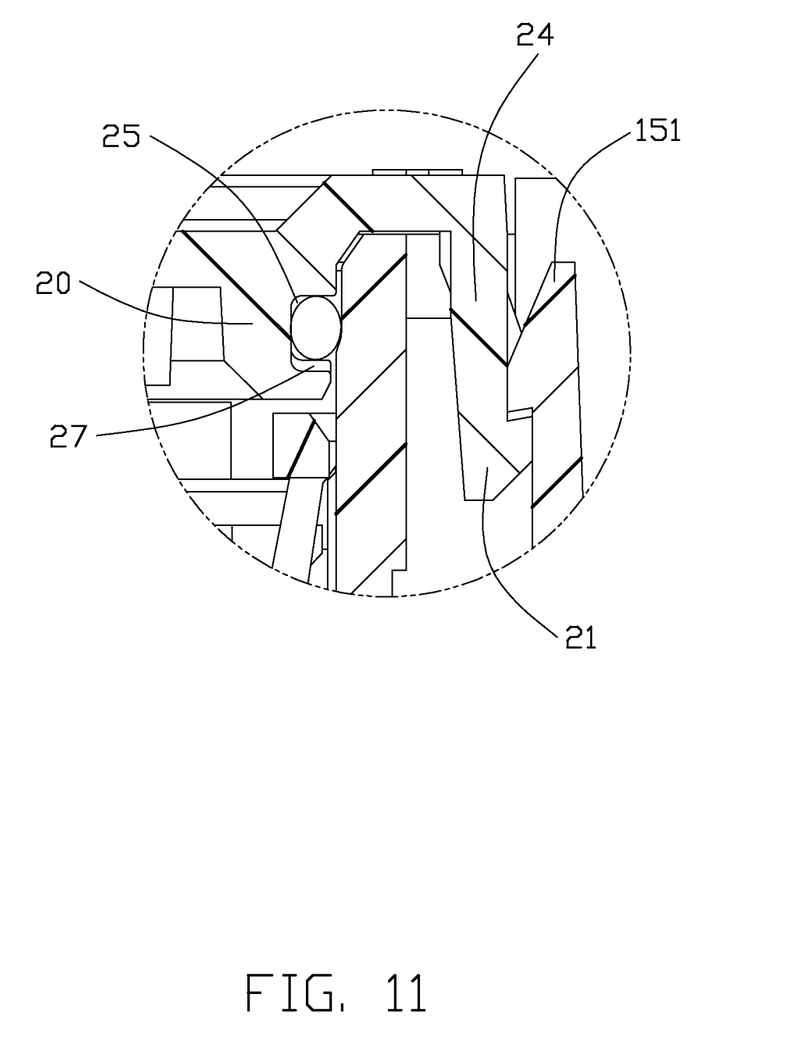
FIG. 11 is an enlarged view of the junction box in a circuit map to FIG. 10.

Please reference to FIGS. 9-11, the cover 2 comprises a plurality of separating walls 20 extending downwardly from peripheral of the cover, the separating walls 20 connect with each other and abut against with an inner surface of the walls of the insulative box 1. The cover 2 further comprises a pretending wall 24 extending downwardly form a front side of the cover and being Parallel to the front wall 12 of the insulative box 1. The pretending wall 24 is located between the front wall 12 and the supporting portion 15. The cover 2 further comprises a latching portion 21 to locking with the resilient locking portion 151 of the insulative box 1 by inserting said latching portion 21 into the corresponding locking slot 122 initially to have the corresponding outwardly deflectable resilient latching portion 151 to resumably outwardly deflected and successively to be interlocked with the resilient locking portion 151. The latching portion 21 also can be set as a slot or a resilient finger. In the present invention, the latching portion 21 is a resilient finger locking with the resilient locking portion 151, and the pretending wall 24 is mostly received in the locking slot 122, a top face of the cover 2 and a top surface of the supporting portion 125 are coplannar to prevent user to open the junction box 100 only by hands. When the contacting portions 62 of the contacting foils 6 connect with the exterior contacting plates of the PV module in the passageway 146, for the contacting plates are easy to bent and may touch the inner wall of the insulative box 1 for its soft feature. A preventing blade 22 extends downwardly from a rear end of the cover 2 to provide an inner wall for the contacting plates depending on, so a height of the preventing blade 22 can increase a safe creepage distance for the junction box 100. The preventing blade 22 further has a plurality of protrusions 23 extending backwardly to lock with the locking holes 131 of the rear wall 13. The separating wall 20 defines a sealing slot 25 along its outside surfaces. An o-ring 8 mounted in the sealing slot 25 seals the insulative box 1 when the cover 2 covers the insulative box 1 to prevent water flowing into an inner side of the junction box 100. The o-ring 8 is made of silicone or plastics materials and is formed in a rectangular circuit configuration. The sealing slot 25 has a tuber 27 at a place of the mold commissure of the cover 2 to enlarge a deformation of the o-ring 8. The tuber 27 extends into the sealing slot 25 from a bottom face thereof.

The cables 4 include two nuts 41 with interior thread and two wires 42 extending through the nuts 41 along a front-to-back direction. The interior threads of the nuts 41 match to the exterior threads of the mounting holes 121. The wires 42 insert into the insulative box 1 through the mounting holes 121 and electrically connect with the connecting portions 61 of the contacting foils 6 through the mounting holes 121, to finally position the cables to the insulative box 1.

As fully described above, based on resiliently locking between the latching portion 21 of the cover 2 and the resilient locking portion 151 of the insulative box 1, the users just need a tool to actuate the resilient locking portions 151 to let the cover 2 open and remove from the insulative box 1 easily. By this arrangement, the junction box 1 is convenient for users service.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A junction box, comprising:
    a cable connecting box including an insulative box and a wire connecting module assembled in the insulative box, the insulative box having a receiving cavity, a bottom wall under the receiving cavity, a plurality of walls surrounding the receiving cavity, the plurality of walls having a front wall, a rear wall and two sidewalls, at least a supporting portion extending along an up-to-down direction located in front of the front wall and connecting with the two side walls, a locking slot defined among the supporting portion, the two side wall and the front wall, and a resilient locking portion disposed in the locking slot;
    a cover covering the cable connecting box, the cover comprising a pretending wall extending downwardly from a front side of the cover and mostly received in the locking slot and a latching portion protruding outwardly from a bottom side of the pretending wall to lock with the resilient locking portion in the locking slot; and
    a cable connecting with the insulative box.

2. The junction box as claimed in claim 1, wherein the resilient locking portion is integrated with the supporting portion.

3. The junction box as claimed in claim 1, wherein the two side walls connect with the front and rear walls, the insulative box further comprises a plurality of mounting holes for the cable extending through to electrically connect with the wire connecting module.

4. The junction box as claimed in claim 3, wherein the resilient locking portion extends upwardly from a bottom of the supporting portion along a down-to-up direction.

5. The junction box as claimed in claim 4, wherein the locking slot opens upwardly, the resilient locking portion can deflect along a front-to-back direction.

6. The junction box as claimed in claim 3, wherein the cover further comprises a plurality separating walls extending downwardly, the pretending wall extends downwardly and is parallel to one of the separating walls located in a front side of the cover.

7. The junction box as claimed in claim 6, wherein the junction box further comprises a o-ring sealing between the cover and the insulative box, the separating wall defines a sealing slot to receive the O-ring.

8. The junction box as claimed in claim 1, wherein the pretending portion can be set as a slot or a resilient finger.

9. A junction box comprising:
    a cable connecting box including an insulative block, a plurality of contacting foils retained in the insulative block, a plurality of diodes connecting with two neighborly contacting foils and a mounting face for being mounted to the PV module and a slit depressing on the mounting face;
    a cover covering the cable connecting box; and
    a cable connecting with the junction box; wherein the cable connecting box further having a receiving cavity, a bottom wall under the receiving cavity, a plurality of walls surrounding the receiving cavity, the plurality of walls having a front wall, a rear wall and two sidewalls, at least a supporting portion located in front of the front wall and connecting with the two side walls, and the cable located under the supporting portion.

10. The junction box as claimed in claim 9, wherein the slit is shown in a circle shape and surrounds in the mounting face.

11. The junction box as claimed in claim 9, wherein the bottom wall has an inner face facing the cover, and the mounting face is opposite to the inner face.

12. The junction box as claimed in claim 11, wherein the insulative box comprises a plurality of positioning blocks to position the insulative block therein.

13. The junction box as claimed in claim 12, wherein the contacting foils comprise a plurality of connecting portions connecting with the cable, a plurality of base portions extending along a mating direction of the cable from the connecting portions and mostly insert-molded in the insulative block.

14. The junction box as claimed in claim 12, wherein a locking slot is formed between the supporting portion and the front wall, the cover further comprising a pretending wall mostly received in the locking slot.

15. A junction box comprising:
    a cable connecting box including an insulative box and a wire connecting module assembled to the insulative box,
    said insulative box having a bottom wall and a plurality of side walls commonly defining a receiving cavity, a supporting portion unitarily formed on an exterior surface of a front side wall of said side walls with a locking slot therebetween, and an outwardly deflectable resilient locking portion located behind the supporting portion and protectively disposed in the locking slot;
    a cover covering said cable connecting box and including a latching portion inserted into said locking slot initially to have the resilient locking portion resumably outwardly deflected and successively to be interlocked with the locking portion; and
    a cable extending from the front side wall of the insulative box.

16. The junction box as claimed in claim 15, wherein said latching portion is resilient, and the front side wall of the insulative box is spaced from the latching portion of the cover so as to allow said latching portion to be inwardly deflected during assembling the cover to the insulative box.

17. The junction box as claimed in claim 15, wherein said cover defines a plurality of downwardly extending separating walls abutting against inner surfaces of the corresponding side walls of the insulative box, and an O-ring surrounds said separating wall to be tightly sandwiched between the separating walls and the corresponding side walls.

18. The junction box as claimed in claim 15, wherein said cover defines a downwardly extending pretending wall with which the latching portion downwardly is associated, and said pretending wall is snugly received in the locking slot.

* * * * *